United States Patent
Yamane et al.

[11] Patent Number: 5,604,030
[45] Date of Patent: Feb. 18, 1997

[54] MAGNETIC RECORDING MEDIUM METHOD AND APPARATUS FOR FABRICATING SAME

[75] Inventors: Haruki Yamane; Masanobu Kobayashi; Yoshinori Maeno; Kayoko Sato, all of Tokyo, Japan

[73] Assignee: Oki Electric Industry Co., Ltd., Tokyo, Japan

[21] Appl. No.: 150,283

[22] Filed: Nov. 10, 1993

Related U.S. Application Data

[62] Division of Ser. No. 706,997, May 29, 1991, abandoned.

[30] Foreign Application Priority Data

May 29, 1990 [JP] Japan ................ 2-137136
Jul. 31, 1990 [JP] Japan ................ 2-201177
Aug. 20, 1990 [JP] Japan ................ 2-216971

[51] Int. Cl.$^6$ ............... G11B 5/66; B32B 5/16; B05D 5/12; C23C 14/00
[52] U.S. Cl. ............... 428/332; 428/336; 428/611; 428/668; 428/670; 428/678; 428/694 T; 428/694 TM; 428/694 ML; 428/694 SC; 428/694 MT; 428/694 MM; 428/900; 427/127; 427/128; 427/129; 427/130; 427/132; 204/197.15; 204/192.2; 204/192.1
[58] Field of Search ............... 204/192.15, 192.2, 204/192.1; 427/127, 128, 129, 130, 132; 428/668, 670, 678, 611, 694 T, 694 TM, 694 ML, 694 SC, 694 MT, 694 MM, 332, 336, 692, 900

[56] References Cited

U.S. PATENT DOCUMENTS

| | | | |
|---|---|---|---|
| 4,324,631 | 4/1982 | Meckel | 204/192 M |
| 4,438,066 | 3/1984 | Aboat | 420/435 |
| 4,587,176 | 1/1985 | Corcie | 428/611 |
| 4,663,193 | 5/1987 | Endo | 427/129 |
| 4,678,721 | 7/1987 | den Breder | 428/607 |
| 5,068,022 | 11/1991 | Corcie | 204/192.15 |

OTHER PUBLICATIONS

Patent Abstracts of Japan, unexamined application, field P, vol. 14, No. 183, Apr. 12, 1990, Kokai-No. 02-29 956.

Patent Abstracts of Japan, unexamined applications, E field, vol. 14, No. 248 May 28, 1990, Kokai-No. 02-69 907.

Patent Abstracts of Japan, unexamined applications, P field, vol. 15, No. 251, Jun. 26, 1991.

Patent Abstracts of Japan, unexamined applications, P field, vol. 15, No. 251, Jun. 26, 1991, Kokai-No. 03-80 445.

*Primary Examiner*—Leszek Kiliman
*Attorney, Agent, or Firm*—Wenderoth, Lind & Ponack

[57] ABSTRACT

A magnetic recording medium having a substrate, and an artificial superlattice deposited on the substrate as a vertical magnetization film. The artificial superlattice is a Co/Pt artificial superlattice which is composed of alternate Co and Pt layers deposited on the substrate. The magnetic recording medium is fabricated by the steps of: disposing a Co target and a Pt or Pd target separating from a substrate; performing an RF sputtering to the substrate by alternately facing the substrate with the Co target and the Pt or Pd target by means of periodical movement of the substrate, thereby forming a Co/Pt or Co/Pd artificial superlattice) on the substrate; and performing heat treatment to the Co/Pt or Co/Pd artificial superlattice at a temperature T in the range of 200° C. to 450° C. inclusive.

8 Claims, 14 Drawing Sheets

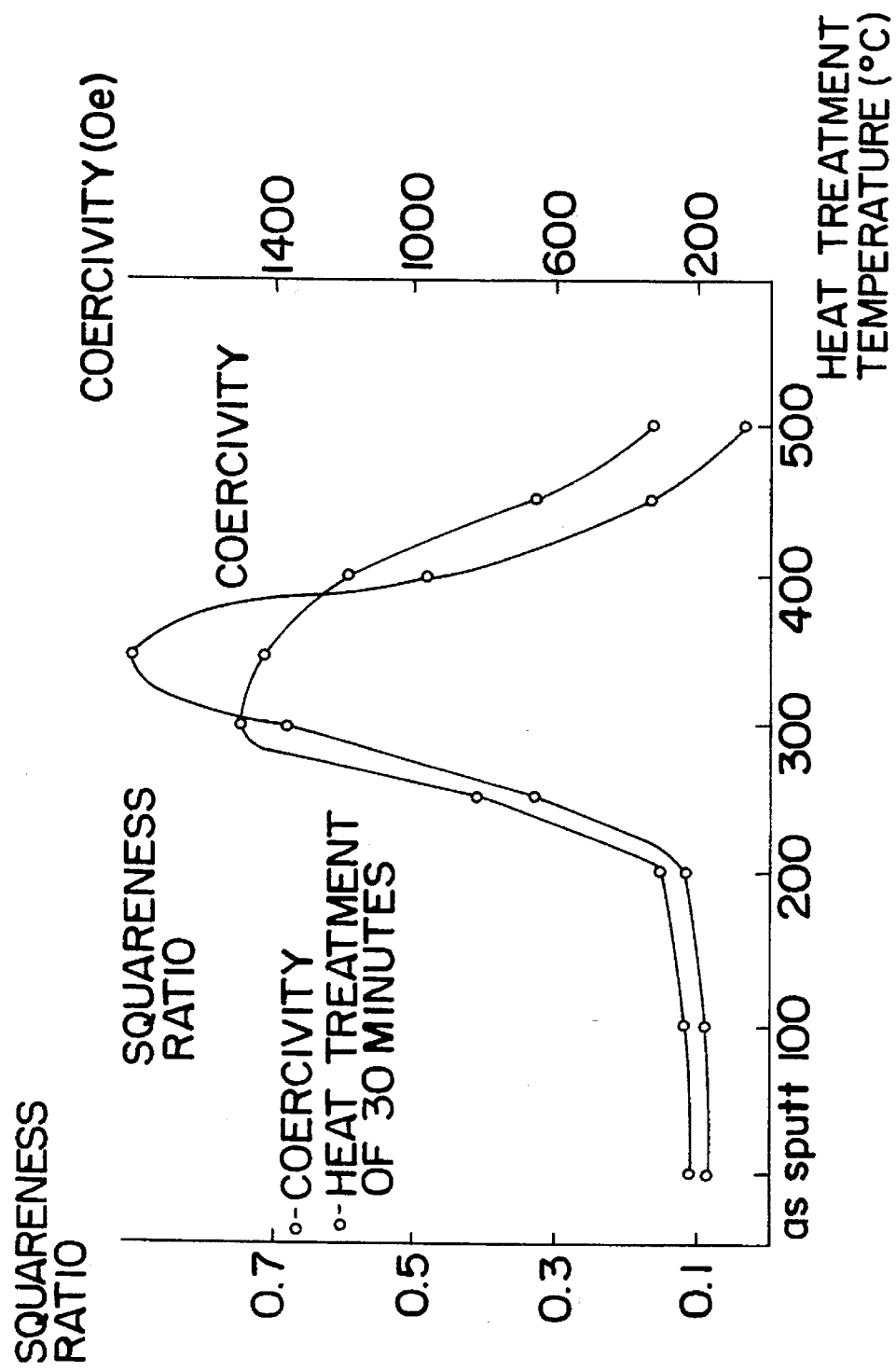

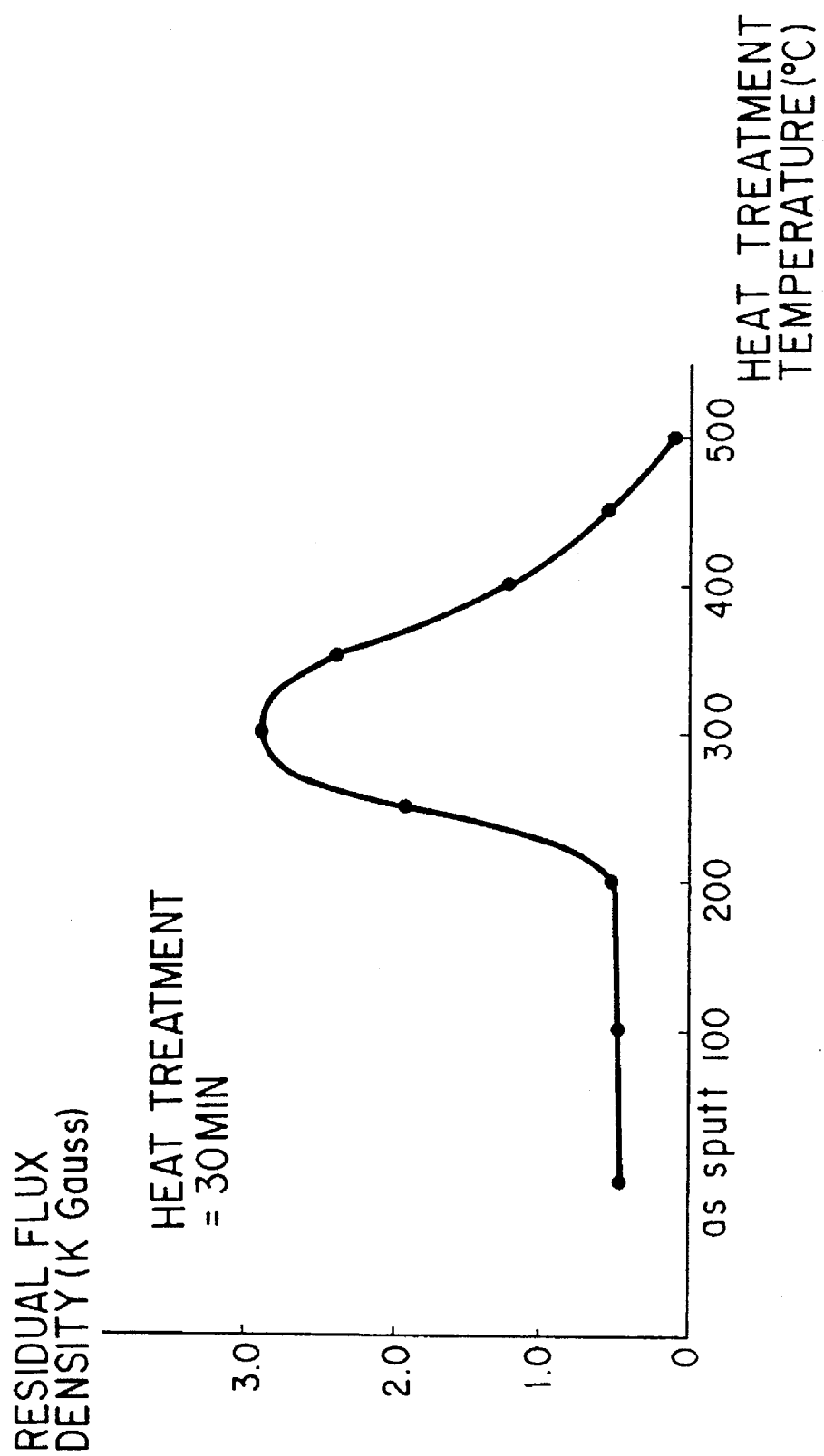

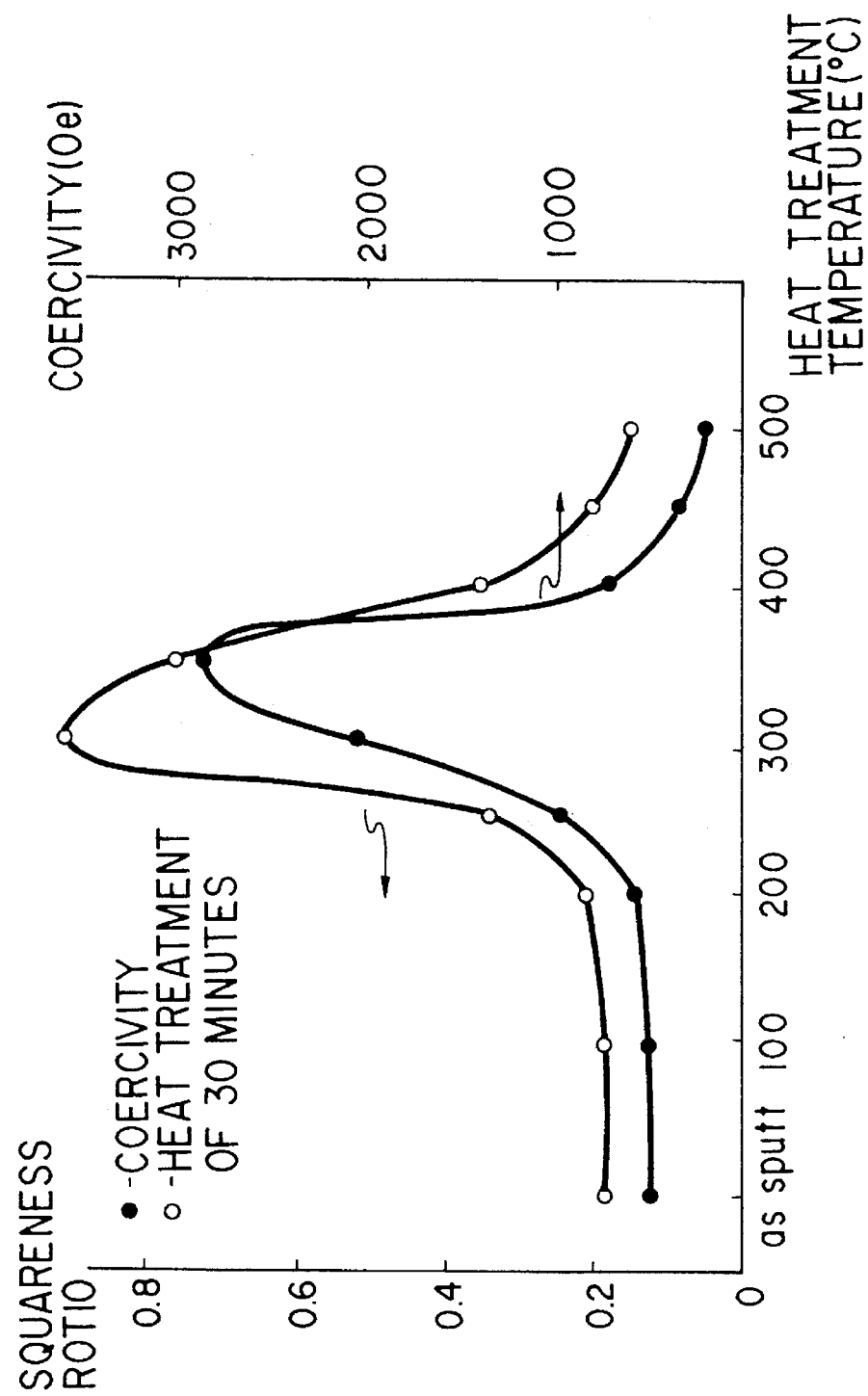

MAGNETIC RECORDING MEDIUM METHOD AND APPARATUS FOR FABRICATING SAME

This application is a divisional of now abandoned U.S. patent application Ser. No. 07/706,997, filed May 29, 1991.

BACKGROUND OF THE INVENTION

1. Field of the Invention

The present invention relates to a magnetic recording medium, method and apparatus for fabricating the medium.

2. Description of the Prior Art

Conventionally, materials for magnetic printer drums are used, for example, by thermo-magnetic printers in which a magnetic latent image is formed on a magnetic recording medium, and the latent image is developed to a visible image (see, Shunji Imamura, "Magnetography Printer", Chapter 15, pp. 159–168, of "Nonimpact printing", CMC, Japan, 1986).

FIG. 1 is a schematic view illustrating printing process of a conventional thermo-magnetic printer. In FIG. 1, a recording magnetic drum 1 rotates in the direction indicated by the arrow A. The recording magnetic drum 1 has on its surface a magnetic recording medium made from a $CrO_2$ thin film or the like for forming a magnetic latent image thereon.

In the printing process, an erasing means 2 initially magnetizes the magnetic recording medium in a predetermined direction. Then, a magnetic recording means 3 forms a designated magnetic latent image thereon, and a development means 4 processes the latent image into a visible image by making toners adhere to the surface of the drum 1 in response to the magnetic latent image. The toners adhere to portions at which magnetic forces produced by the leakage magnetic field on the surface of the magnetic recording medium intersect the surface of the magnetic recording medium. Thus, the magnetic latent image is developed to a visible image.

Following this, a transfer means 5 and a fixing means 6 transfers and fixes the visible image on paper, respectively. Finally, a cleaning means 7 removes remaining toners from the magnetic recording means, thus completing the printing process.

The magnetic latent image can be recorded on the magnetic recording medium by using a thermal head or by irradiating a laser beam to heat the recording medium. The magnetic recording medium can be magnetized in two different directions: one mainly along the surface of the recording medium (longitudinal recording method); and the other in the direction perpendicular to the surface of the recording medium (vertical recording method), The vertical recording method is used when a high resolution is required. Magnetic recording media for the vertical recording are formed with alloy films of elements of the rare earth family and i ton family, that is, with RE-TM alloy films or Co-Cr alloy films. The RE-TM alloy films are mainly used for photomagnetic disks using a magnetic recording method, and the Co-Cr alloy films are mainly used for magnetic disks using a magnetic head recording method.

These days, thin films such as Co/Pt artificial superlattices or Co/Pd artificial superlattices, or multilayer films that overlay these artificial superlattices can be used as vertical magnetization films.

These magnetic recording media, however, have the following problems: the Co-Cr alloy films have high Curie points, and this makes it difficult to carry out the thermo-magnetic recording; the RE-TM alloy films, on the other hand, has small residual flux density, and this makes the adhesion of toners insufficient.

In addition, with regard to the Co/Pt artificial superlattices or Co/Pd artificial superlattices, although squareness ratios of the magnetic hysteresis curve thereof are unity as long as the films are extremely thin of hundreds of angstroms, the squareness ratios decline below unity when the film thickness is thousands of angstroms, which gives only insufficient residual flux density for magnetic recording. In addition, the coercivity is small, about 200 Oe. The multilayer films of the artificial superlattices, on the other hand, can be used as magnetic recording media because they have a squareness ratio of unity and coercivity of about 2,000 Oe. These films, however, are difficult to fabricate, and further, it takes long time to fabricate them.

As described above, although the thermo-magnetic printers using vertical magnetization films for vertical recording can achieve, in their principle, reliable recording with a high resolution, and can operate with small power consumption, they have the following problems: first, there is no appropriate materials for the vertical magnetization films; and second, for improving the magnetic characteristics of the recording media, the structure of films becomes complex, and hence the fabrication thereof becomes difficult.

SUMMARY OF THE INVENTION

It is therefore an object of the present invention to provide a recording medium, a method and apparatus for fabricating the magnetic recording medium for vertical recording which has a high residual flux density, a high coercivity, and a low Curie temperature, thereby eliminating the problems of the conventional magnetic recording medium.

According to a first aspect of the present invention, there is provided a magnetic recording medium comprising a substrate, and an artificial superlattice deposited on the substrate as a vertical magnetization film, the artificial superlattice being a Co/Pt or Co/Pd artificial superlattice which is composed of alternate Co and Pt layers or Co and Pd layers deposited on the substrate.

Here, the thickness $d_{Co}$ of the Co layer may be in the range of 1 angstrom to 15 angstroms inclusive, and the thickness $d_{Pt}$ or $d_{Pd}$ of the Pt or Pd layer may be in the range of 2 angstroms to 30 angstroms inclusive.

According to a second aspect of the present invention, there is provided a method of fabricating a magnetic recording medium comprising the steps of: (a) disposing a Co target and a Pt or Pd target separating from a substrate; and (b) performing a sputtering to the substrate by alternately facing the substrate with the Co target and Pt or Pd target by means of periodical movement of the substrate, thereby forming a Co/Pt or Co/Pd artificial superlattice on the substrate.

In addition, heat treatment may be performed to the Co/Pt or Co/Pd artificial superlattice at a temperature T in the range of 200° C. to 450° C. inclusive.

Here, the heat treatment may be carried out one or more minutes, and/or the sputtering may be an RF sputtering and carried out with applying a positive voltage to the substrate.

According to a third aspect of the invention, there is provided an apparatus for fabricating a recording medium which is composed of a substrate and an artificial superlattice, the apparatus comprising: a Co target disposed opposite the substrate a predetermined distance apart; a Pt or Pd target disposed opposite the substrate a predetermined distance apart; means for alternately facing the Co target and Pt or Pd target with the substrate by periodically moving the substrate; and means for performing an RF sputtering of the Co target and Pt or Pd target, thereby forming the artificial superlattice on the substrate.

Here, the apparatus for fabricating a magnetic recording medium may comprise a power supply for applying a positive voltage to the substrate.

According to the present invention, the arrangement of the film is simpler than those of conventional films, and hence the fabrication of the film is made easier. In addition, vertical magnetization films of lower Curie points, higher residual flux densities and higher coercivity can be obtained. Moreover, applying a plus voltage to the substrate during the RF sputtering further improves the magnetic characteristics after the heat treatment, thereby enabling higher density recording. By using the recording medium to thermo-magnetic printers, for example, a higher resolution and a smaller power consumption can be achieved.

BRIEF DESCRIPTION OF THE DRAWINGS

The objects and features of the present invention will become more apparent from the consideration of the following detailed description taken in conjunction with the accompanying drawings in which:

FIG. 2A is a cross sectional view of the magnetic recording medium, and FIG. 2B is a side view of a magnetic drum for the recording medium;

FIGS. 4A and 4B represent a schematic diagram showing an apparatus for fabricating the magnetic recording medium of the present invention, whereas FIG. 4A is a front view of the apparatus, and FIG. 4B is a plan view of the apparatus;

FIG. 5A shows a magnetization loop before the heat treatment, and FIG. 5B shows a magnetization loop after the heat treatment;

FIG. 6 is a diagram illustrating the relationship between the heat treatment temperature and the magnetic characteristics in the second embodiment;

FIG. 7 is a diagram illustrating the relationship between the heat treatment temperature and the residual flux density in the second embodiment;

FIG. 11A is a cross sectional view of the magnetic recording medium, FIG. 11B is a side view of a magnetic drum for recording;

FIG. 13 is a diagram illustrating the relationship between the heat treatment temperature and the magnetic characteristics in the third embodiment.

DESCRIPTION OF THE PREFERRED EMBODIMENTS

Figure 1:
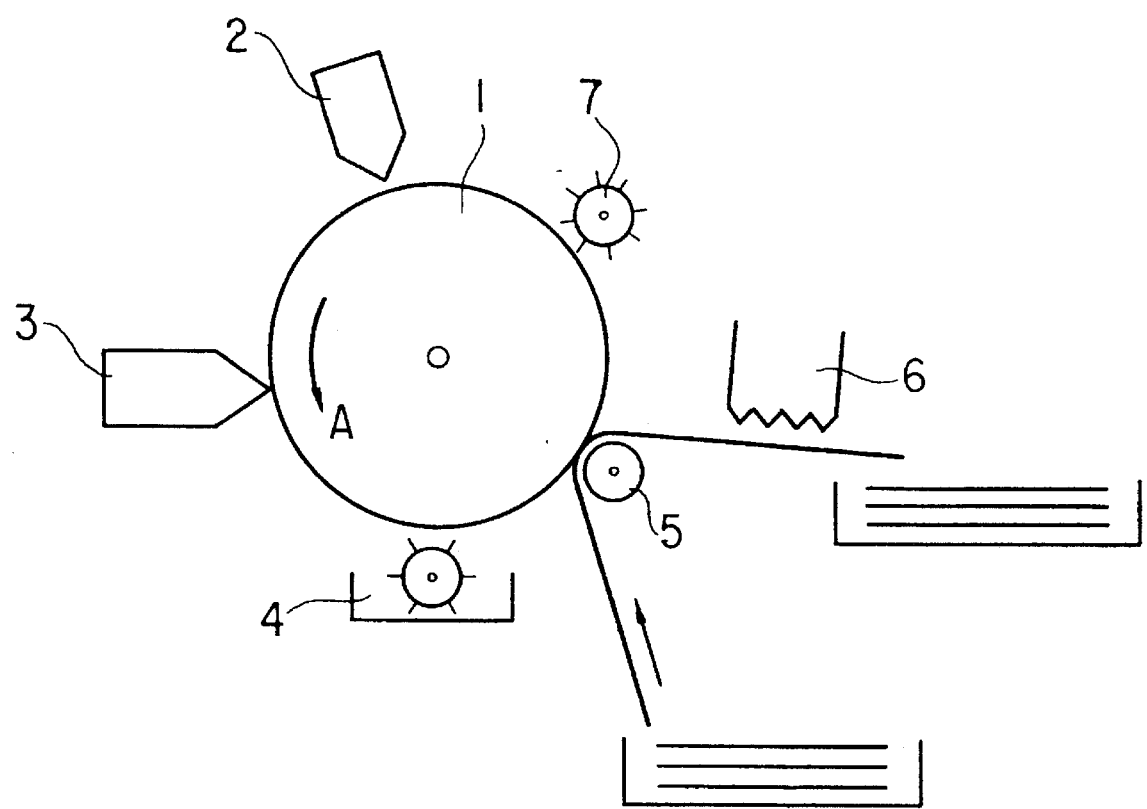
FIG. 1 is a schematic view illustrating a printing process of a conventional thermo-magnetic printer.
Figure 2A:
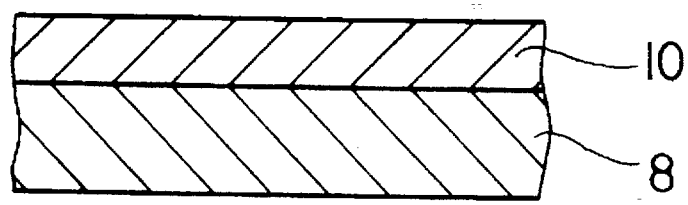
FIGS. 2A and 2B show a magnetic recording medium of the present invention.
Figure 2B:
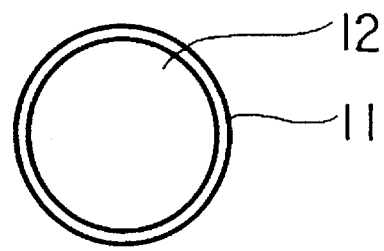

FIGS. 2A and 2B shows a magnetic recording medium of the present invention: FIG. 2A is a cross sectional view of the magnetic recording medium; and FIG. 2B is a side view of a magnetic drum for the recording medium. In FIGS. 2A and 2B, the magnetic recording medium 11 is formed by depositing a vertical magnetization film, namely, a Co/Pt artificial superlattice 10 hundreds of micrometers thick on a freely bendable stainless steel substrate 8 tens to hundreds of micrometers thick by using an RF (Radio Frequency) sputtering process. The magnetic recording medium 11 is formed in a sheet, and is wound on a magnetic drum core material 12.

Figure 3:
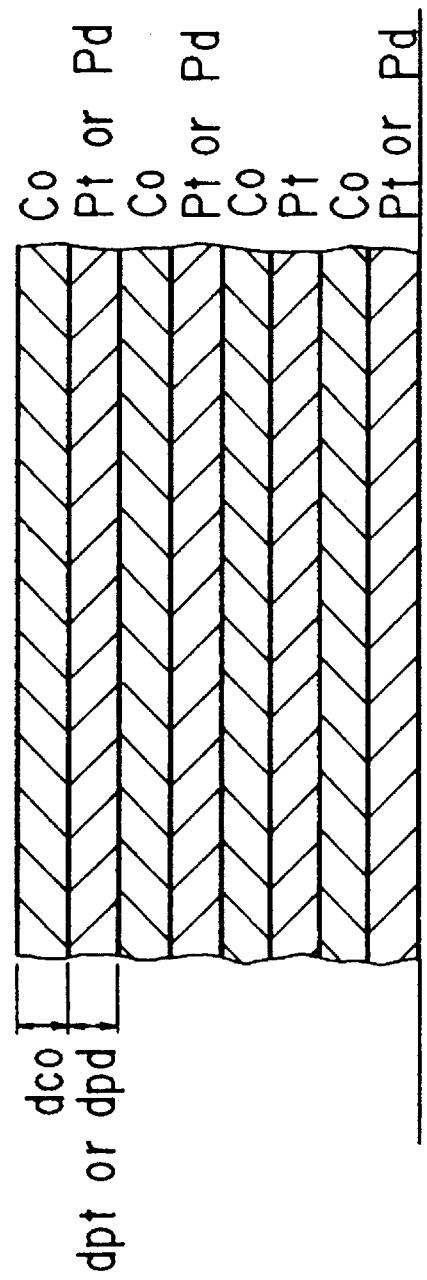
FIG. 3 is a cross sectional view showing an artificial superlattice of the magnetic recording medium.

FIG. 3 is a cross sectional view of an artificial superlattice of the magnetic recording medium 11. As shown in this figure, Co layers and Pt layers, or Co layers and Pd layers are alternately deposited.

EMBODIMENT OF AN APPARATUS

Figure 4A:
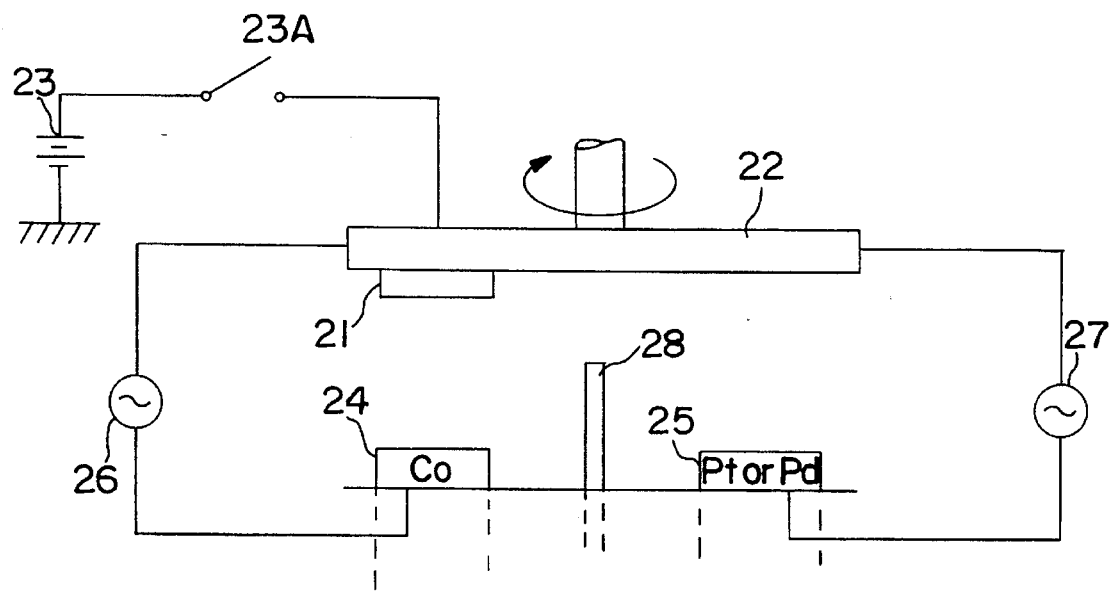
Figure 4B:
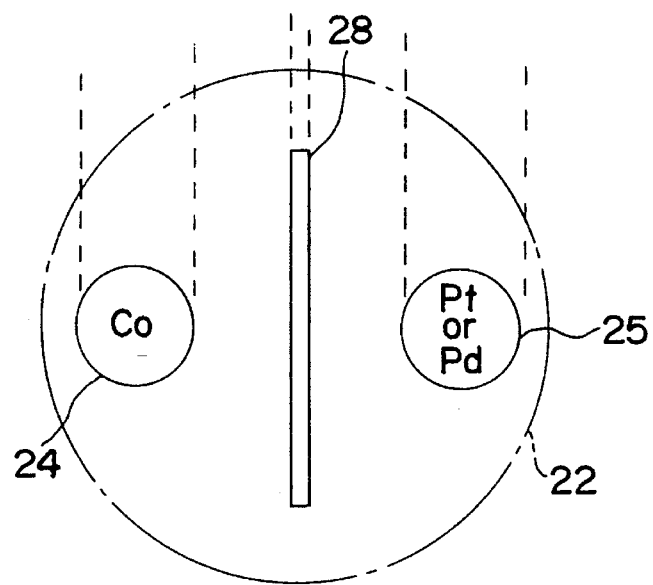

FIG. 4 includes a front view (A) and a plan view (B) of an apparatus for fabricating the magnetic recording medium of the present invention. In the figure, reference numeral 21 denotes a substrate which is disposed on a rotating plate 22, and on which the artificial superlattice is to be deposited by the sputtering process. The substrate 21 is provided with a plus voltage from a power supply 23 via a switch 23A as necessary. Reference numeral 24 designates a Co target disposed opposite the substrate 21, and similarly reference numeral 25 denotes a Pt (or Pd) target disposed opposite the substrate 21.

Between the Co target 24 and the rotating plate 22, an RF power supply 26 for sputtering is connected, and likewise between the Pt (or Pd) target 25 and the rotating plate 22, an RF power supply 27 for sputtering is connected. In addition, between the Co target 24 and the Pt (or Pd) target 25, there is placed a partition board 28.

In this voltage applying type RF multiple sputtering apparatus thus arranged, the substrate 21 rotates above the Co target 24 and Pt (or Pd) target 25 with the rotation of the rotating plate 22 so that Pt (or Pd) and Co are periodically, alternately deposited, thereby forming the artificial superlattice. The thickness $d_{Co}$ of the Co layer of the Co/Pt artificial superlattice 10 is in the range of 1 angstrom to 15 angstroms inclusive, and that of the Pt layer $d_{Pt}$ is in the range of 2 angstroms to 30 angstroms inclusive.

FIRST EMBODIMENT OF RECORDING MEDIUM

Next, a first embodiment of a recording medium of the present invention will be described. In the first embodiment, the RF sputtering is performed without applying the plus voltage to the substrate 8 (or 21): the Co/Pt artificial superlattice 10 is formed by periodically, alternately depositing the Co layer the thickness $d_{Co}$ of which is 5 angstroms and the Pt layer the thickness $d_{Pt}$ of which is 15 angstroms; and subsequently, the artificial superlattice 10 is subjected to the heat treatment at 300° C. for thirty minutes. Thus, the magnetic recording medium 11 is formed. The magnetic recording medium 11 was estimated: the coercivity was about 1,000 Oe, and the residual flux density was approximately 2,000 Gauss, which presented a sufficient magnetic force for attracting magnetic toners; and the Curie temperature was approximately 200° C.

SECOND EMBODIMENT OF RECORDING MEDIUM

Next, a second embodiment of a recording medium of the present invention will be described. In this embodiment, a Co/Pt artificial superlattice is formed by carrying out an RF sputtering process while applying a plus voltage to the substrate 8 (or 21). The Co/Pt artificial superlattice is formed by periodically depositing Co layers of thickness $d_{Co}$=5 angstroms, and Pt layers of thickness $d_{Pt}$=15 angstroms alternately, while applying a voltage of 50 V to the substrate 8 (or 21) by closing the switch 23A. In addition, after the formation of the artificial superlattice, heat treatment of 300° C. is applied for 30 minutes. Thus, the magnetic recording medium 11 is formed on which thermal magnetic recording is performed.

Figure 5A:
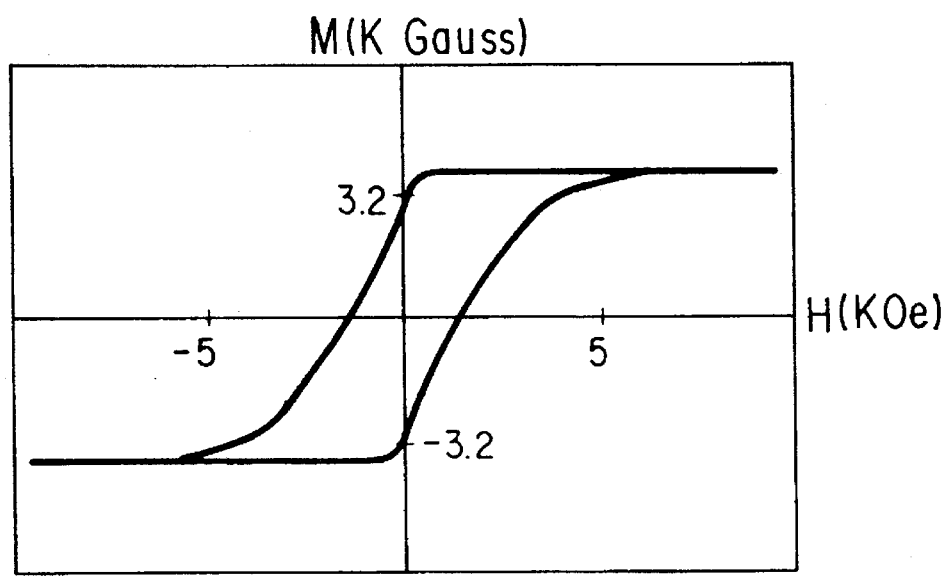
FIGS. 5A and 5B are diagrams comparatively illustrating the magnetization loops before and after the heat treatment of the fabrication of the magnetic recording medium by a second embodiment of the present invention.
Figure 5B:
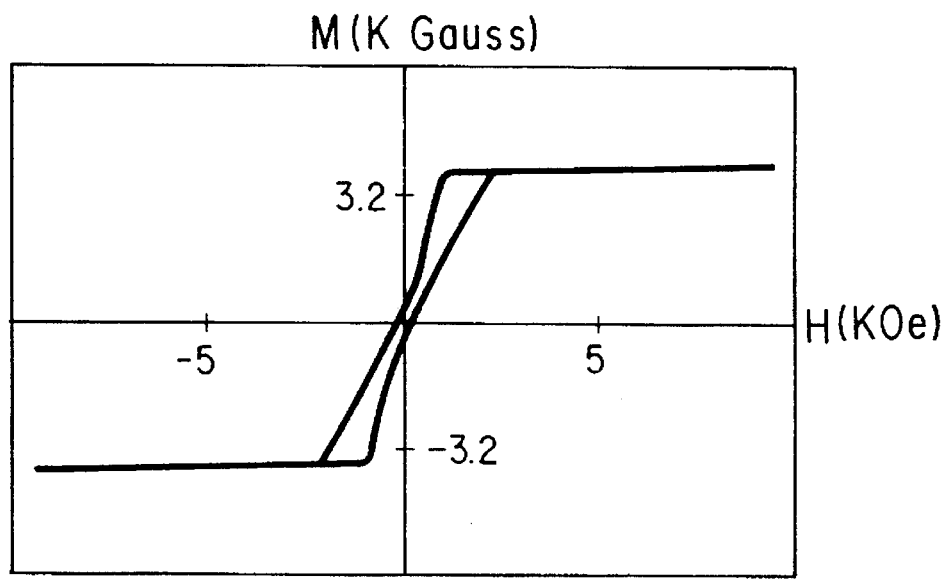

Next, the characteristics of the magnetic recording medium of the second embodiment of the present invention will be described with reference to FIGS. 5A and 5B. FIGS. 5A and 5B are diagrams comparatively illustrating the magnetization loops before and after the heat treatment of the fabrication of the magnetic recording medium by the second embodiment: FIG. 5A is a magnetization loop diagram before the heat treatment; and FIG. 5B is a magnetization loop diagram after the heat treatment.

Evaluation of the magnetic recording medium 11 showed that the coercivity was approximately 1,500 Oe, the residual flux density was 3,000 Gauss, and the Curie temperature was less than about 200° C. Thus, the magnetic recording medium 11 has magnetic force sufficient to attract toners of a magnetic material.

FIG. 6 is a diagram illustrating the relationship between the heat treatment temperature and the magnetic characteristics in the second embodiment, and FIG. 7 is a diagram illustrating the relationship between the heat treatment temperature and the residual flux density in the second embodiment.

Here, the applied voltage is 50 V, and the heat treatment time is 30 minutes. As shown in these figures, heat treatments at 200° C.–450° C. improve the magnetic characteristics, and that of 300° C. presents the best value.

Figure 8:
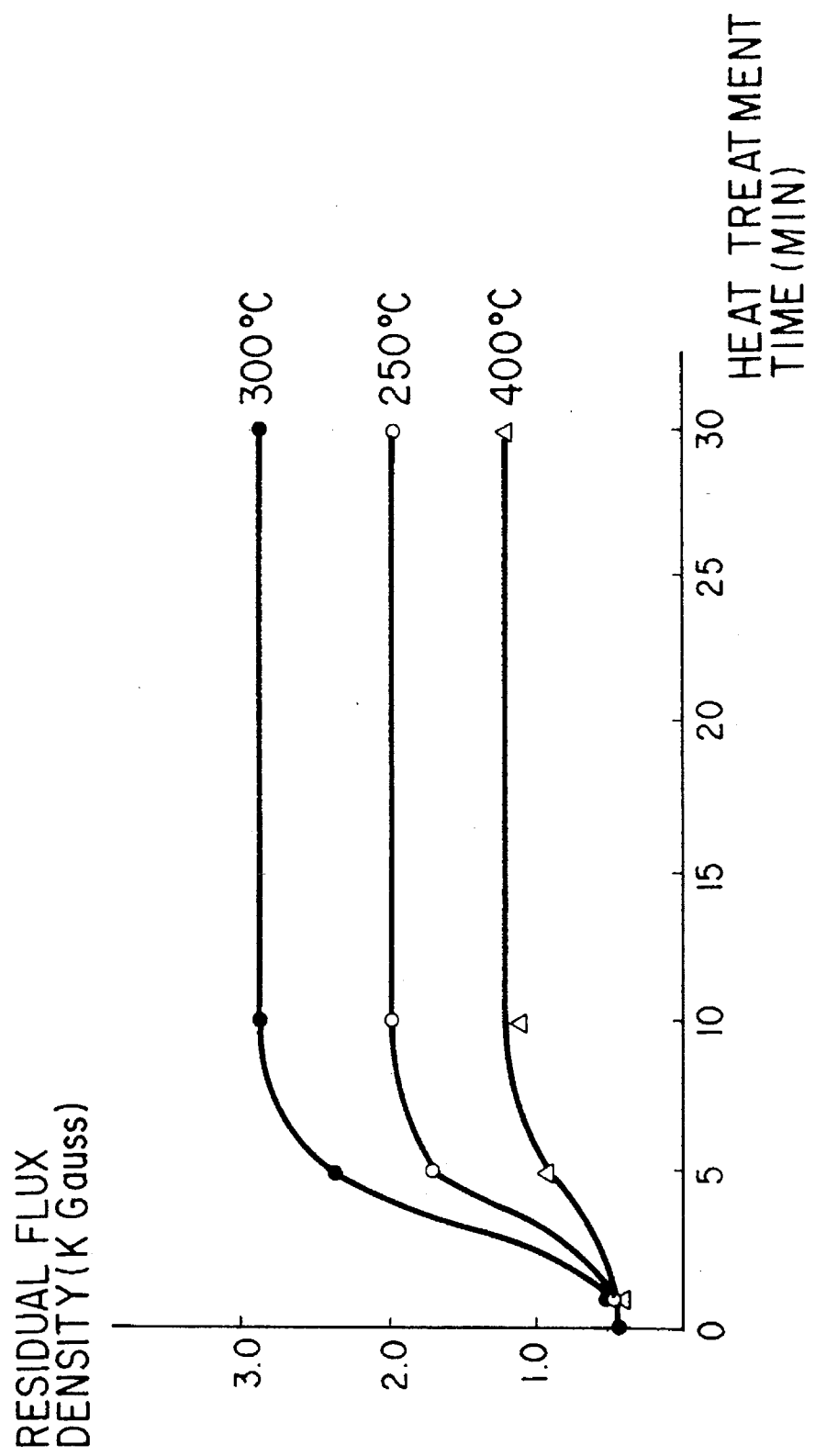
FIG. 8 is a diagram illustrating the relationship between the heat treatment time and the residual flux density when the heat treatment temperature is changed as 250° C., 300° C. and 400° C. in the second embodiment.
Figure 9:
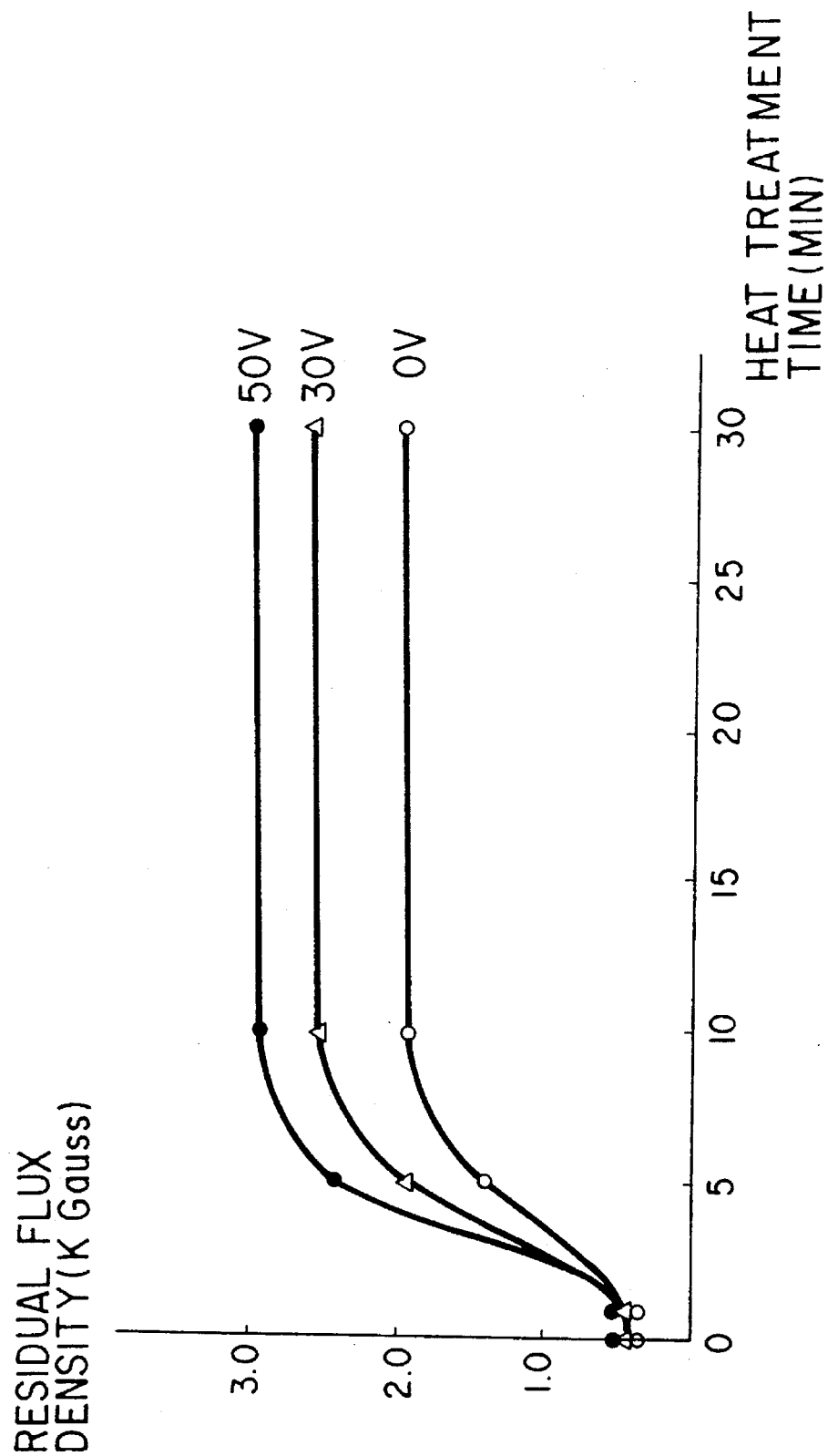
FIG. 9 is a diagram illustrating the relationship between the heat treatment time and the residual flux density when the applying voltage to the substrate is changed as 0 V, 30 V and 50 V in the second embodiment.

FIG. 8 is a diagram illustrating the relationship between the heat treatment time and the residual flux density when the heat treatment temperature is changed as 250° C., 300° C. and 400° C. in the second embodiment, and FIG. 9 is a diagram illustrating the relationship between the heat treatment time and the residual flux density when the applying voltage to the substrate is changed as 0 V, 30 V and 50 V in the second embodiment. Incidentally, when the applying voltage to the substrate is 0, it corresponds to the first embodiment of the present invention.

As shown in these figures, heat treatments more than one minutes improve the magnetic characteristics, i.e., increase the residual flux densities, which reach constant values with heat treatment beyond ten minutes.

Figure 10:
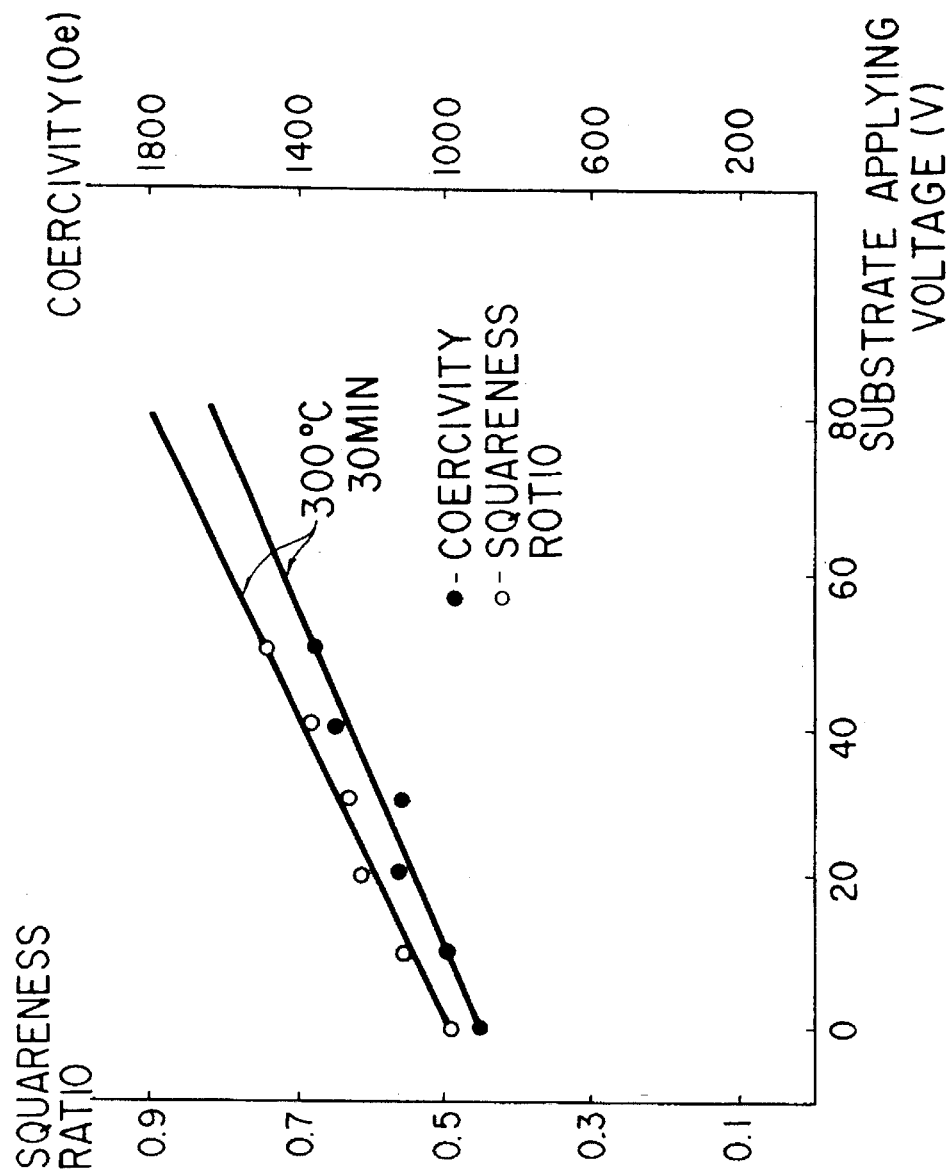
FIG. 10 is a diagram illustrating the relationship between the substrate applying voltage and the magnetic characteristics after heat treatments in the second embodiment.

FIG. 10 is a diagram illustrating the relationship between the substrate applying voltage and the magnetic characteristics after heat treatments in the second embodiment. As shown in FIG. 10, increasing the applying voltage during the formation of the artificial superlattice improves the magnetic characteristics of the artificial superlattice, although the magnetic characteristics are improved after heat treatment even when the applying voltage is 0 V.

Figure 11A:
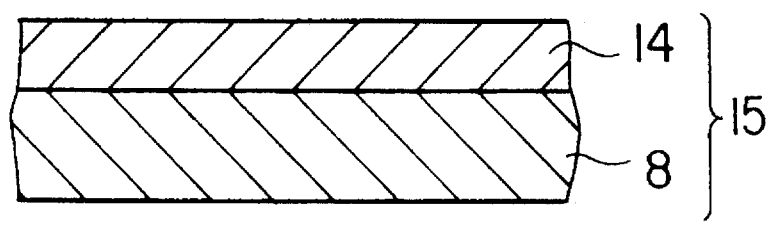
FIGS. 11A and 11B are views showing another magnetic recording medium fabricated with a method of the present invention.
Figure 11B:
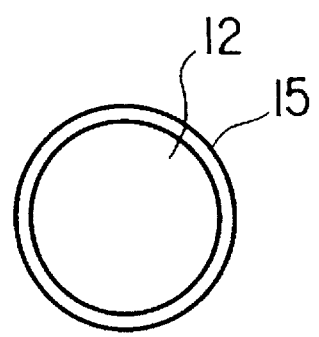

FIGS. 11A and 11B shows another magnetic recording medium fabricated with a method of the present invention: FIG. 11A is a cross sectional view of the magnetic recording medium; and FIG. 11B is a side view of a magnetic drum for recording. In these figures, the magnetic recording medium 15 is formed by depositing a vertical magnetization film, namely, a Co/Pd artificial superlattice 14 hundreds of micrometers thick on a freely bendable stainless steel substrate 8 tens to hundreds of micrometers thick by using an RF sputtering process. The magnetic recording medium 15 is formed in a sheet, and is wound on a magnetic drum core material 12.

The thickness $d_{Co}$ of the Co layer of the Co/Pd artificial superlattice 14 falls from 1 angstrom to 15 angstroms inclusive, and that of the Pd layer $d_{Pd}$ falls within the range of 2 angstroms through 30 angstroms inclusive.

THIRD EMBODIMENT OF RECORDING MEDIUM

Next, the magnetic recording medium 15 of the above arrangement will be described as a third embodiment of a recording medium of the present invention. In the third embodiment, the RF sputtering is performed without applying the plus voltage to the substrate 8: the Co/Pd artificial superlattice 14 is formed by periodically depositing the Co layer the thickness $d_{Co}$ of which is 5 angstroms and the Pd layer the thickness $d_{Pd}$ of which is 15 angstroms; and subsequently, the artificial superlattice 14 is subjected to the heat treatment at 390° C. for thirty minutes. Thus, the magnetic recording medium 15 is formed. The magnetic recording medium 15 was estimated: the coercivity was about 2,000 Oe, and the residual flux density was approximately 3,000 Gauss, which presented a sufficient magnetic force for attracting magnetic toners; and the Curie temperature was less than approximately 200° C.

Figure 12A:
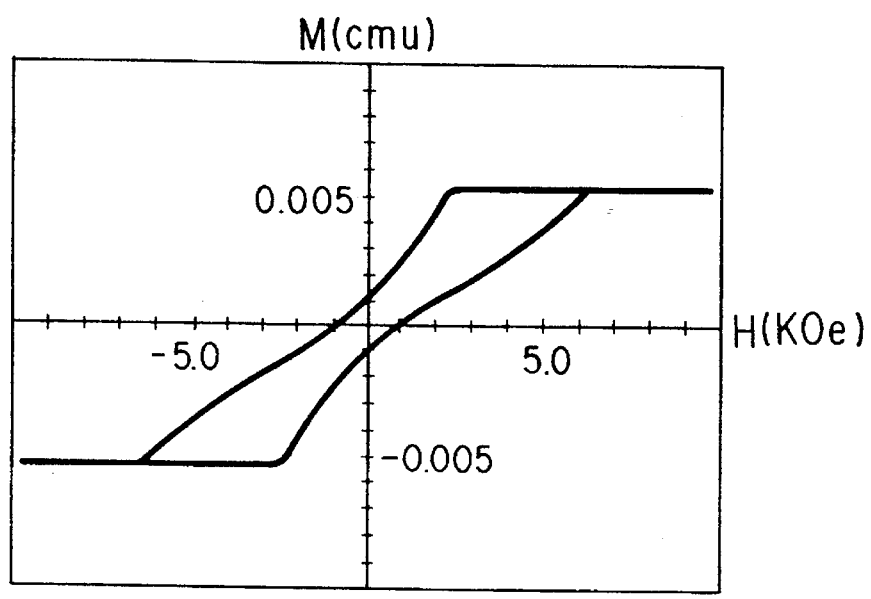
FIGS. 12A and 12B are diagrams comparatively illustrating the magnetization loops before and after the heat treatment of the magnetic recording medium by a third embodiment, FIG. 12A plots a magnetization loop diagram before the heat treatment, and FIG. 12B plots a magnetization loop diagram after the heat treatment.
Figure 12B:
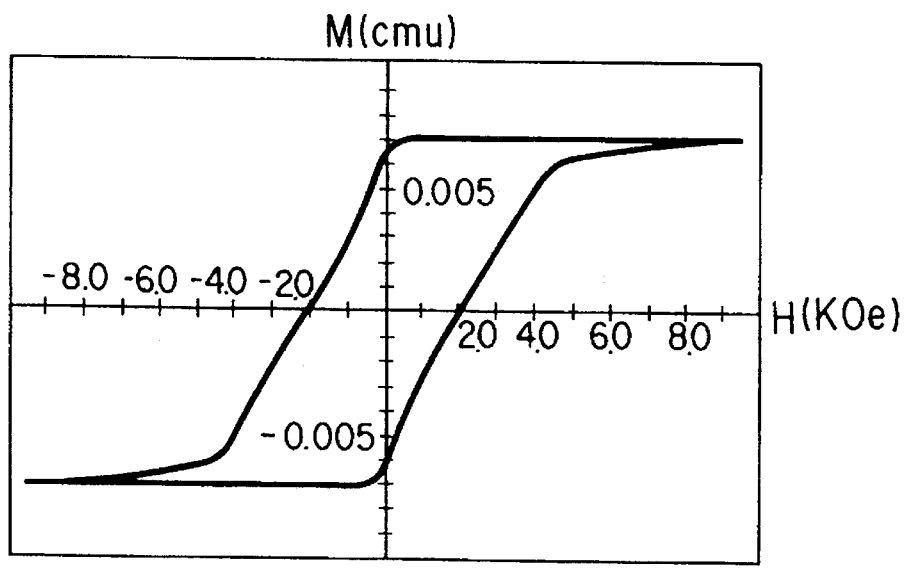

Next, the characteristics of the magnetic recording medium fabricated by the third embodiment of the present invention will be described with reference to FIGS. 12A and 12B. FIGS. 12A and 12B are diagrams comparatively illustrating the magnetization loops before and after the heat treatment of the fabrication of the magnetic recording medium by the third embodiment: FIG. 12A plots a magnetization loop before the heat treatment; and FIG. 12B plots a magnetization loop after the heat treatment. As shown in these figures, the magnetic characteristics after the heat treatment are greatly improved.

Figure 14:
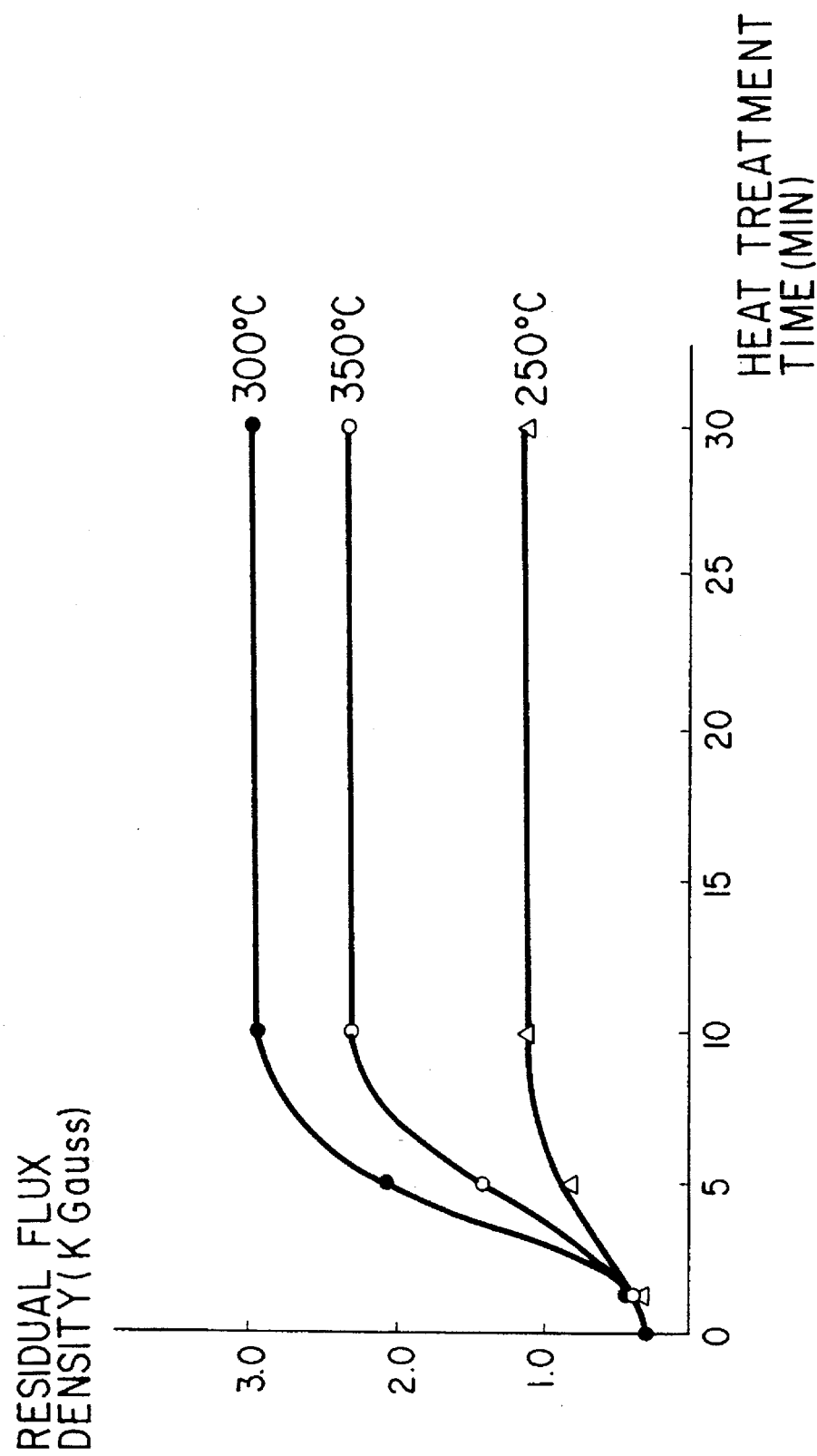
FIG. 14 is a diagram illustrating the relationship between the heat treatment temperature and the residual flux density when the heat treatment temperature is altered as 250° C., 300° C. and 350° C. in the third embodiment.

FIG. 13 is a diagram illustrating the relationship between the heat treatment temperature and the magnetic characteristics in the third embodiment, and FIG. 14 is a diagram illustrating the relationship between the heat treatment temperature and the residual flux density when the heat treatment temperature is altered as 250° C., 300° C. and 350° C. in the third embodiment.

As shown in these figures, with the increase of heat treatment time beyond one minute, the magnetic characteristics are increasingly improved, and reach constant values above ten minutes. In addition, the heat treatment at 200° C.–450° C. improves the magnetic characteristics, giving the best value at 300° C.

In the third embodiment, the magnetic characteristics after the heat treatment can be further improved by applying the plus voltage to the substrate 8 during the RF sputtering as in the second embodiment, As described above, those embodiments are directed to the superlattices fabricated by means of the RF sputtering. In addition, an RF magnetron sputtering may be advantageously applicable as an alternative embodiment to form a Co/Pt artificial superlattice or a Co/Pd artificial superlattice, resulting in the advantages substantially equivalent to the aforementioned illustrative embodiments. Furthermore, direct-current (DC): sputtering and DC magnetron sputtering may also be applicable as an alternative embodiment to fabricate a Co/Pt artificial superlattice or a Co/Pd artificial superlattice. The latter embodiment also resulted in the advantages substantially equivalent to the aforementioned illustrative embodiments.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

For example, although in the above embodiments, the stainless steel substrate 8 is used as a substrate of the magnetic recording media 11 and 15, a nonmagnetic polyimide resin substrate can be employed. Furthermore, although the magnetic recording media 11 and 15 are applied to the thermo-magnetic printer in the above examples, they can be applied to other recording apparatuses that carry out recording by using radiation of heat or light. In addition, although the artificial superlattices 10 and 14 were hundreds of micrometers thick, and the stainless steel substrate 8 was tens to hundreds of micrometers thick, thickness thereof can be changed depending on the application thereof.

What we claim is:

1. A magnetic recording medium having a substrate, comprising an artificial superlattice deposited on said substrate as a vertical magnetization film, said artificial superlattice being a Co/Pt artificial superlattice which is composed of alternate Co and Pt layers deposited on said substrate, whereas said Co layer has a thickness in the range of 1 angstrom to 15 angstroms inclusive, and said Pt layer has a thickness in the range of 2 angstroms to 30 angstroms inclusive and wherein said artificial superlattice has been heat treated at a temperature of 200° C. to 450° C., inclusive, at least for one minute.

2. A magnetic recording medium having a substrate, comprising an artificial superlattice deposited on said substrate as a vertical magnetization film, said artificial superlattice being a Co/Pd artificial superlattice which is composed of alternate Co and Pd layers deposited on said substrate, whereas said Co layer has a thickness in the range of 1 angstrom to 15 angstroms inclusive, and said Pd layer has a thickness in the range of 2 angstroms to 30 angstroms inclusive and wherein said artificial superlattice has been heat treated at a temperature of 200° C. to 450° C., inclusive, at least for one minute.

3. A method of fabricating a magnetic recording medium comprising the steps of:
   (a) disposing a Co target and a Pt target at a distance off a substrate;
   (b) performing a sputtering on the substrate by alternately facing the substrate to the Co target and the Pt target, thereby alternately depositing, on the substrate, a Co layer whose thickness is set between 1 angstrom and 15 angstroms inclusive, and a Pt layer whose thickness is set between 2 angstroms and 30 angstroms inclusive, to form a Co/Pt artificial superlattice; and
   (c) heat treating, following said step (b), the Co/Pt artificial superlattice at a temperature in the range of 200° C. to 450° C. inclusive, at least for one minute.

4. A method in accordance with claim 3 wherein said sputtering is any one of, an RF sputtering, an RF magnetron sputtering, a DC sputtering and a DC magnetron sputtering.

5. A method in accordance with claim 3, wherein said sputtering is either one of an RF sputtering and an RF magnetron sputtering, a positive voltage being applied to said substrate during the sputtering to cause said Co/Pt artificial superlattice to be deposited thereon, followed by said step (c) of heat treatment.

6. A method of fabricating a magnetic recording medium comprising the steps of:
   (a) disposing a Co target and a Pd target at a distance off a substrate;
   (b) performing a sputtering on the substrate by alternately facing the substrate to the Co target and the Pd target, thereby alternately depositing, on the substrate, a Co layer whose thickness is set between 1 angstrom and 15 angstroms inclusive, and a Pd layer whose thickness is between 2 angstroms and 30 angstroms inclusive, to form a Co/Pd artificial superlattice; and
   (c) heat treating, following said step (b), the Co/Pd artificial superlattice at a temperature in the range of 200° C. to 450° C. inclusive, at least for one minute.

7. A method in accordance with claim 6 wherein said sputtering is any one of an RF sputtering, an RF magnetron sputtering, a DC sputtering and a DC magnetron sputtering.

8. A method in accordance with claim 6, wherein said sputtering is either one of an RF sputtering and an RF magnetron sputtering, a positive voltage being applied to said substrate during the sputtering to cause said Co/Pd artificial superlattice to be deposited thereon, followed by said step (c) of heat treatment.

* * * * *